United States Patent [19]

Harris et al.

[11] Patent Number: 4,496,058
[45] Date of Patent: Jan. 29, 1985

[54] SHOPPING ORGANIZER

[76] Inventors: Garrett R. Harris; Frances T. Harris, both of 4118 - 50 A St., Red Deer, Alberta, T4N 1Y9, Canada

[21] Appl. No.: 499,993

[22] Filed: Jun. 1, 1983

[51] Int. Cl.³ .............................................. A47F 5/00
[52] U.S. Cl. .................................... 211/86; D19/88; 206/557; 211/50; 211/69.1; 248/231.8; 281/45
[58] Field of Search ............... 211/50, 51, 69.1, 69.5, 211/69.8, 86, 88; 248/226.5, 232, 451, 452, 453; 206/557, 565; 40/308; D19/88; 281/45

[56] References Cited

U.S. PATENT DOCUMENTS

| | | | |
|---|---|---|---|
| 1,032,820 | 7/1912 | Dykeman | 211/52 |
| 1,575,696 | 3/1926 | La Salle | 211/50 X |
| 2,754,029 | 7/1956 | Maxcey | 211/86 X |
| 2,907,584 | 10/1959 | Neilsen | 211/69.5 X |
| 2,958,566 | 11/1960 | Buck | 211/86 X |
| 4,066,171 | 1/1978 | Rowlie | 211/69.1 |
| 4,176,743 | 12/1979 | Fitzpatrick | 211/50 X |
| 4,357,881 | 11/1982 | De Long | 211/88 X |

Primary Examiner—Robert W. Gibson, Jr.
Attorney, Agent, or Firm—Karl L. Spivak

[57] ABSTRACT

A novel shopper's helper assembly, particularly for grocery shoppers is provided herein. It includes a base and an open bin disposed adjacent one portion of the base, the bin being spaced a predetermined close distance from one side edge of the base to provide a first flat surface, and a predetermined large distance from the other side edge, to provide a second flat paper-supporting surface. The open bin includes a clip located therein for releasably retaining a plurality of sheets of paper. A clip is located along a side edge of the first flat surface for releasably holding a cylindrical writing instrument (e.g. a pen or pencil) of such first flat surface, and a hole at the top thereof for selectively releasably supporting the cylindrical writing instrument therein. A clip is located at an edge of the second flat paper-supporting surface for releasably retaining a pad, or plurality of sheets of paper. One or two longitudinally extending downwardly open cross-section, e.g. generally C-shaped cross-section, clamps are secured to the undersurface of the base for releasably retaining the assembly on a complementarily-shaped, e.g. cylindrically-shaped support. In this way the assembly can be carried into the store where shopping is to be done and can clip temporarily but securely onto the handle of a shopping cart. This assembly affords space for a shopping list, discount coupons, calculators and pencils, and it can also hold an abundance of paper.

14 Claims, 5 Drawing Figures

SHOPPING ORGANIZER

BACKGROUND OF THE INVENTION (i) Field of the Invention

This invention relates to a novel assembly which may be used as a multi-purpose board to assist shoppers, particularly grocery shoppers.

(ii) Description of the Prior Art

Many multi-purpose clipboards have been proposed in the past. For example, in Canadian Pat. No. 674,988 patented Nov. 26, 1963 by M. Vernon, the patentee provided a combined paper clip and pencip holder, namely, such an article which may be attached to the cover of a loose leaf binder or book in a convenient position thereon, thereby to provide the user with a writing implement and with means for holding papers within the binder.

Canadian Pat. No. 725,948 patented Jan. 18, 1966 by A. P. Plotzker et al provided a portable work surface, e.g., a clipboard. The patentee realized that clipboards conventionally were simply a flat surface of generally rectangular outline having a clip centrally located at the top thereof releasably to retain a pad or number of sheets of work paper or the like. The patentee proposed a clipboard in which the fatiguing strain of a continued tight grip for extended periods on the board by the user was to be obviated. This was achieved by a point of substantial "balance" of the board through the medium of a grip element for ready manipulation of the board conveniently by the user. Thus, the patentee provided a clipboard having two novel elements in combination, namely: (1) a hand graspable grip element, such as a fixed knob or the like, mounted generally centrally or otherwise appropriately on the back of the board presenting the work surface; and (2) a portion emerging or otherwise offset from a lower corner of the board, suitably configured along its outer surface comfortably to rest in and be contacted by the bend of the elbow of the user when the grip element is grasped.

Canadian Pat. No. 775,926 patented Jan. 16, 1968 by T. A. Benjamin provided a device for releasably holding papers, charts, and the like, and, more particularly, a clipboard construction wherein the paper clamping means can be easily locked in an open position, thereby facilitating the insertion, removal, or re-arrangement of papers contained therein. The patentee realized that conventional clipboards or chart holders had a base, a clamping bar which was held in a clamping relationship with the base by means of a relatively strong spring, and a cover hingedly mounted to the clamping bar. These devices possessed numerous disadvantages, not the least of which being that they required awkward manipulation to hold them in an open position when it was desired to insert or remove papers therefrom. The patentee provided an attractive clipboard of increased capacity having a novel latching construction enabling the clamping means to be locked easily in an open position. Such clipboard was provided with a clamping bar shaped to accommodate increased capacity, and a latching mechanism which included a pair of lug-receiving recesses or slots in the base for releasably locking the clamping bar in an open position. Accordingly, folding the cover back and applying continued pressure in the direction of rotation exerted an upward pull on the clamping end of the clamping bar and engaged the latching mechanism. The operator was then free to use both hands to insert, remove or re-arrange papers therein.

U.S. Pat. No. 1,226,452 patented May 15, 1917 by A. B. Bolton provided improvements in copy holders. The copy holder was provided with a movable extension so that it would be used in connection with the ordinary size stenographers' notebook, and also with legal size paper, and which would bring the copy in front of the operator. The patented copy holder was composed of a bracket having means for attachment to a support, a rectangular bed plate attached to the bracket and movable from an inclined upright position to an angular position thereof, a stop and a clip at diametrically opposite corners of the plate, and a movable extension at the remaining corner adapted to be extended when the plate was in its angular position.

U.S. Pat. No. 1,865,241 patented June 28, 1932 by H. E. Dock provided supports for memorandum sheets, e.g., of a type primarily adapted for use by automobile drivers. The patented memorandum support was composed of a spring metal clamp adapted for support upon a post and having a slotted throat portion, and a memorandum sheet supporting plate having a slot opening on one edge thereof removably secured thereby within the throat slot.

U.S. Pat. No. 1,883,714 patented Oct. 18, 1932 by F. G. Gray provided an improved portable desk constructed for application and temporary use on a steering wheel of an automobile. The patentee realized that travelling salesmen and insurance collectors using automobiles required an effective device for temporary use as a writing desk. The patented portable writing desk was composed of a box-like receptacle having forward, rear, and side walls and including a multiplicity of compartments to accommodate various articles, and a hingedly mounted cover for the receptacle defining a writing board, the rear wall of the receptacle being of such height as to project above the writing surface of the board to function as a ledge.

U.S. Pat. No. 1,892,721 patented Jan. 3, 1933 by V. A. Cardarelli provided a combined memorandum pad holder designed primarily for use on the steering wheels of motor vehicles. The patented memorandum pad holder was composed of a body portion constructed of sheet material, clamps at the ends of the body portion for clamping a memorandum sheet thereto, a downwardly curved flange extending from one side of the body portion, and yieldable means on the body portion and engaging the spokes of the steering wheel for securing the body portion on the wheel. The yieldable means was adapted to urge the body portion laterally, forcing the flange into engagement with the hub of the steering wheel securely to hold the body portion against movement.

U.S. Pat. No. 2,263,154 patented Nov. 18, 1941 by W. E. Witting provided a paper and pencil holder or memo recorder which was said to provide a simple and novel means for jotting down permanent memorandum in the home, shop, office or automobile. The patented paper and pencil holder included a base plate with an upturned flange at one side, and mounting means for the plate. The other, opposite sides at right angles to the first side of the plate were bent upwardly and inwardly to form opposed inwardly opening channels, and then rolled outwardly to form sleeves over the channels, for holding papers and pencils, respectively.

U.S. Pat. No. 2,604,724 patented July 29, 1952 by W. C. Watts provided a combined holder for a pad and pencil, e.g., a holder especially adapted to be mounted on the base of a "French" type telephone. The patented one-piece combined pad and pencil holder was composed of a mounting portion including a vertical part and inwardly extending upper and lower parts for engaging the upper and lower surfaces of the base, respectively. A pad-holding portion was integral with the mounting portion and included a vertical wall substantially in the plane of the vertical part, and a second wall parallel with the first wall and located inwardly thereof, the walls being of equal width and integral with the upper inwardly extending part, one of the walls forming a cylindrical pencil holder.

U.S. Pat. No. 2,876,022 patented Mar. 3, 1959 by J. E. Kroviak provided an improved clipboard which had novel means for expeditiously and firmly securing such board in position for convenient use on either arm, leaving both hands free at all times to be used for other purposes. The patented rectangular clipboard included a clamp engageable with one end portion of a writing pad for securing the pad on the board. A pair of anchors were removably mounted on diagonally opposite corners of the board. An elastic strap was secured under tension to the anchors for retaining the anchors on the board and were engageable beneath an arm of the board user for securing the board thereon. A resilient finger on one of the anchors was engageable with the other end portion of the pad for clamping the pad to the board.

U.S. Pat. No. 3,289,676 patented Dec. 6, 1966 By J. A. Saunders provided equipment for the keeping of records of various kinds, including at hospitals. The patentee realized that the keeping of records at hospitals on individual patients had been done using chart holders. Conventionally such chart holders have included a type of looseleaf binder of rectangular shape with a hinge at one end and a rod extending through the hinge and beyond with a roller on each to be received in slots or openings on a rack in a disk or otherwise, so that the holder could be supported with the holder suspended or depending. This type of device had disadvantages in that it was of poor appearance with too much of its upper portion exposed and therefore not as readily acceptable to streamlining and trimness as desired, as well as being relatively heavy, somewhat cumbersome and clumsy to use, complicated and expensive. The patented chart holder was composed of front and back covers of identical character, each having spaced hinge portions at one end, and a generally U-shaped connector comprising a curved bight portion and spaced leg portions having space hinge portions at the free end of each leg portion complementary to the hinge portion of the front and back covers. A pintle extended through the complementary hinge portions of the front and back covers and the respective U-shaped connector leg portions, the hinge portions being constricted beyond the ends of the pintle for retaining the latter in place. A mounting tube was provided which was of a section having a curvature conforming to the bight portion and was mounted within the bight portion of the U-shaped connector and which was of a length to extend entirely through and beyond the ends thereof with the exposed end portion of the tube serving as means by which the chart holder could be suspended. The connector leg portions were of a length approximating the diameter of the tube. Means were provided for securing the mounting tube to the generally U-shaped connector. A cap was disposed over each exposed end of the mounting tube providing a cover and wear-resistant bearing sleeve over each end of the tube. The front cover had, on its top surface near its hinge portions, struck-up spaced oppositely channel-forming retaining portions for receipt of a name plate therebetween. A spring clip was disposed along the inside surface of the back cover near the hinged end of the same, the spring clip having clamping jaws for gripping opposite surfaces of a chart sheet therebetween.

U.S. Pat. No. 4,023,763 patented May 17, 1977 by H. E. Pulley provided a pendant recipe holder suitable for mounting on the underneath surface of shelves or cabinets and adapted to hold recipe cards and the like for viewing. The patentee realized that, when the homemaker decided to use a recipe printed on one of the cards, she removed the card from the file container and placed it on a counter for ready reference while the recipe was being prepared. In such a position on the counter, of course, recipe ingredients might be spilled on the card, thereby soiling it and making subsequent replacement of the card necessary. The patented recipe card holder was composed of a bracket member adapted for mounting on the underneath surface of a shelf or similar structure, and included a flange which extended generally downwardly when the bracket member was so mounted. A generally flat support plate having a front face and a back face was provided, one end of the support plate being attached to the flange to pivot between a pendant position and a position in which the plate is generally parallel with the underneath surface to which the bracket is mounted. The support plate had an opening therein near one end of the plate and a tab extending from the margin of the opening generally upwardly of the margin. A clip member was provided comprising an elastic strip of material having a pair of openings in the wall thereof and formed into a demi-cylinder so that the ends of the strip were generally contiguous. The strip was disposed so that one end of the strip extended through the opening in the support plate and curved downwardly to engage the back face of the support plate in such a way that the tab extended through one of the openings in the strip. That the other end of the strip curved forwardly and downwardly of the support plate. A lever element was provided having an engagement portion and a finger portion extending from the engagement portion. The lever element was disposed so that the finger portion thereof extended through the other opening in the strip. The engagement portion was positioned between the other end of the strip and the support plate and was forced by the other end to press against the front face of the support plate.

U.S. Pat. No. 4,243,249 patented Jan. 6, 1981 by H. C. Goss provided a document holder assembly particularly adapted for use by a pilot on a small aircraft and/or a navigator to both maintain a log and for access to flight plan data. The patentee realized that numerous sheets of paper containing essential data for the flight of an aircraft are utilized, some at different times, during the flight. Because of the number of different documents involved, it was particularly useful and desirable to centralize their location for ready access by a pilot and/or navigator of an aircraft, particularly a small aircraft. The patented document holder assembly included the combination of a support base including a bent edge portion at opposite sides each having a strap-receiving opening. Strap means were provided which engaged the strap-receiving opening in the support base for attachment thereto for support at a desired location.

A carrier plate having a rigid face surface was provided to support the documents for continuous accessible use by the personnel. Two document clamp members were secured to the carrier plate to extend along two adjoining sides thereof releasably to retain individual documents while superimposed on the face surface of the carrier plate. In this way, lifting of the upper document while it was retained by one document clamp member exposed an underlying document while it was retained by the other document clamp member. A pivot was provided to interconnect the carrier plate and the support base in a superimposed manner for rotational positioning of documents while the documents were retained on the carrier plate by the clamp members relative to the support base.

SUMMARY OF THE INVENTION (i) Aims of the Invention

In spite of these various multi-purpose or special purpose clipboards, there is still the need for an assembly including a clipboard which is specially adapted to the needs of a shopper especially a grocery shopper and adapted for use as a shopper's helper.

It is an object of the present invention to provide such an assembly to maintain one set of papers and for access to another set of papers.

It is another object of the present invention to provide such an assembly adapted releasably to hold papers upon a surface suitable for writing, while at the same time, providing a surface that can hold other papers.

It is a further object of the present invention to provide a card or coupon holder which is adapted releasably to hold and to store coupons or cards.

It is yet another object of the present invention to provide a card or coupon holder adapted for mounting on a shopping cart.

An important object of the invention is to provide such an assembly which is adapted to hold a pencil or pen conveniently at hand.

Another object of the invention is to provide such an assembly which will be securely held in position within easy access of the operator of the shopping cart.

Another object of the invention is to provide such an assembly which may be readily positioned.

A still further object of the invention is to provide such an assembly so constructed that the pad may be readily removed and replaced without the necessity of removing the assembly from the shopping cart.

Yet another object of the invention is to facilitate the reading and writing of various sorts of paper by a shopper by utilizing a support which may be detachably clamped to a portion of the shopping cart in a position where it may be easily seen.

Still another object of the present invention is to provide such an assembly including a pad and pencil holder that affords such convenience to the user that, at all times, there is paper and pencil within "finger tip" reach.

Another object of the invention is to provide such an assembly which does not require tools of any sort for mounting or dismounting the same, and yet which is so formed that it retains its operative position on the shopping cart under all conditions of normal use.

Another object of the invention is to provide such an assembly that is designed to be mounted at the rear of a shopping cart to obviate interference with the normal use of the shopping cart and yet which is handy to the user.

Another object of the invention is to provide such an assembly in which cards, papers, or a pad may be inserted to allow visibility at all times and which is readily accessible for jotting down notes in a jiffy.

Another object of the invention is to provide an improved means for mounting the assembly upon the supporting shopping cart.

It is a further object of the invention to provide such an assembly on which a pencil, pen or other similarly shaped article can be held so that the user of the assembly will also have the convenience of a pencil close at hand.

Other objects of the invention are to provide such an assembly which will be comparatively simple in construction, strong, durable, compact, of light weight, highly efficient and reliable in use and which may be manufactured at low cost.

(ii) Statements of the Invention

By this invention, a shopper's helper is provided comprising: (a) a base; (b) an open bin disposed adjacent one portion of the base, the open bin including a clip located therein for releasably retaining a plurality of sheets of paper, the bin being spaced a predetermined close distance from one side edge of the base to provide a first flat surface, and a predetermined large distance from the other side edge thereby providing a second flat paper-supporting surface, the open box including a clip thereon for releasably retaining a plurality of sheets of paper; (c) a clip located along a side edge of the first flat surface for releasably holding a cylindrical writing instrument thereon, and a hole at the top thereof for selectively releasably supporting that cylindrical writing instrument therein; (d) a clip at an edge of the second flat paper-supporting surface for releasably retaining a pad, or a plurality of sheets of paper; (e) at least one longitudinally extending downwardly open cross-section clamp secured to the underface of the base for releasably retaining the clipboard on a complementarily-shaped support.

(iii) Other Features of the Invention

By a feature thereof, the bin is integral with the base.

By a preferred embodiment of this invention, a shopper's helper assembly is provided comprising: (a) a rectangular base having a front edge, a rear edge, a right-hand edge and a left-hand edge; (b) rectangular open bin disposed adjacent the right-hand edge of the rectangular base, the bin having a long, inboard, side wall, a long, outboard side wall, a short front wall and a short rear wall, the open bin including a clip located at an edge thereof for releasably retaining a plurality of sheets of paper, the outboard side wall being spaced a predetermined close distance from the right-hand side edge of the base to provide a narrow ledge between the long outboard side wall and the right-hand edge, the narrow ledge having a right-hand side edge, an upper edge and a lower edge, and the inboard side wall being spaced a predetermined large distance from the right-hand side edge, thereby providing a flat plateau, paper-supporting, clipboard surface between the long inboard side wall and the left-hand edge, the flat plateau having a left-hand side edge, a front edge and a rear edge; (c) a clip located along the right-hand side edge of the narrow ledge for releasably holding a cylindrical writing instrument thereon, and a hole adjacent the upper edge of the narrow ledge for selectively releasably supporting the cylindrical writing instrument therein; (d) a clip located at an edge of the flat plateau paper-supporting clipboard for releasably retaining a pad of paper, or a plurality of sheets of paper; and (e) at least one, and preferably two, longitudinally extending, downwardly open cross-section clamp secured to the underface of the base for releasably retaining the shopper's helper assembly on a complementarily-shaped support.

By a feature thereof, the downwardly-open cross-section clamp is a generally C-shaped clamp.

By another feature thereof, the clip which is located at a wall of the open bin is contiguous with the short rear wall of the open bin.

By yet another feature thereof, that clip is located at the central portion of the short rear wall.

By still another feature thereof, the clip along the right-hand side edge of the narrow ledge is located one-third of the distance from the lower edge of the narrow ledge.

By a further feature, the clip at an edge of the flat plateau is located contiguous to the left-hand side edge thereof.

By yet a further feature, that clip is centrally located contiguous to the left-hand side edge thereof.

By another feature thereof, two such generally C-cross-section clamps are offset, towards the rear edge of the rectangular base, from the central longitudinal axis of the rectangular base.

By another feature, a such clamp is located adjacent the left-hand edge of the rectangular base, below the flat plateau, and the other clamp is located adjacent the right-hand edge of the rectangular base below the open rectangular bin.

By yet another feature thereof, such generally C-cross section clamp is centrally located with respect to the rectangular open bin, and the other such generally C-cross section clamp is centrally located with respect to the flat plateau.

(iv) Generalized Description of the Invention

By virtue of the novel arrangement of elements in the assembly of this invention, the work surface is rendered solidly braceable and is self-orienting. An assembly is provided which is attractive and consists of a minimum number of light-weight parts.

BRIEF DESCRIPTION OF THE DRAWINGS

In the accompanying drawings.

DESCRIPTION OF PREFERRED EMBODIMENT

Figure 1:
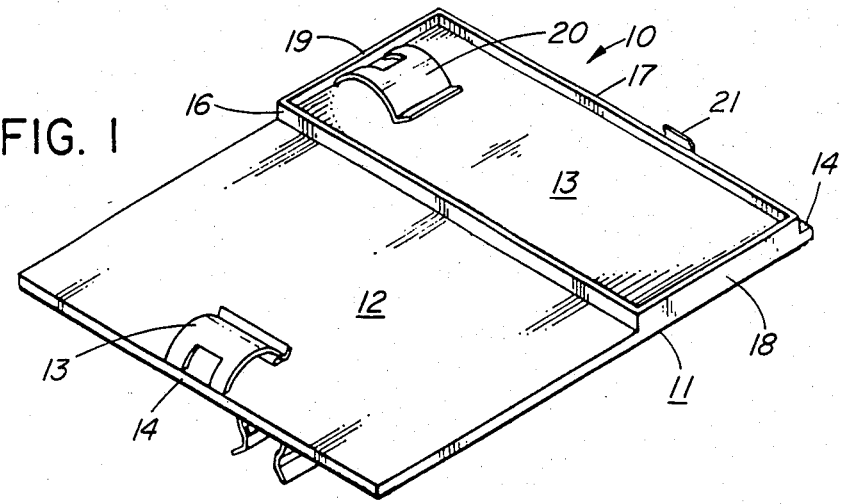
FIG. 1 is a perspective view of the shopper's helper assembly.
Figure 2:
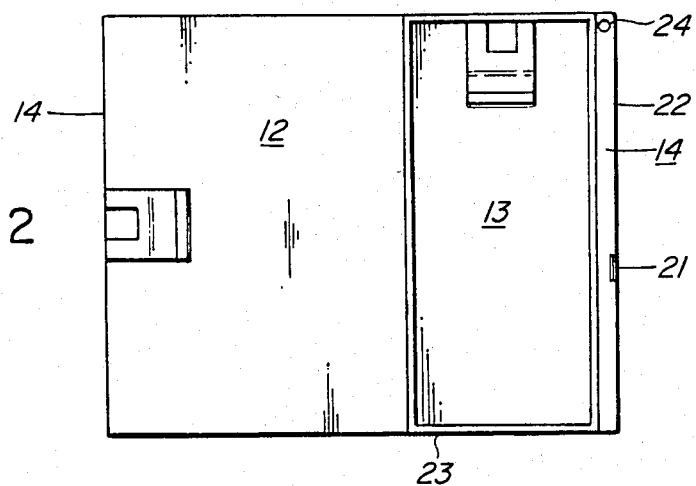
FIG. 2 is a top plan view thereof.
Figure 3:
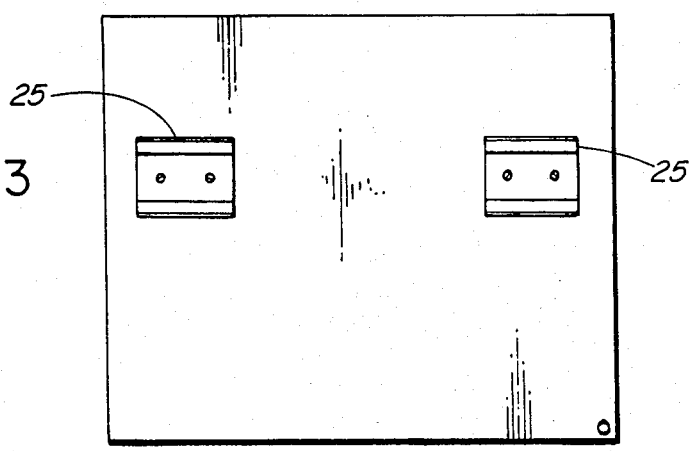
FIG. 3 is a bottom plan view thereof.
Figure 4:
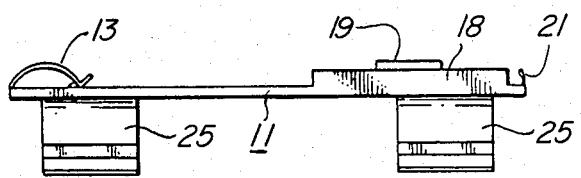
FIG. 4 is a front elevational view thereof.
Figure 5:
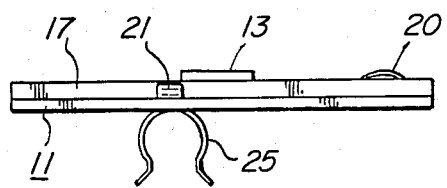
FIG. 5 is a side elevational view thereof.

The shopper's helper assembly 10 comprises a flat rigid board 11 of pressed-board, wood, plastic, etc., divided into three main areas. The first main area 12 is a flat plateau area and serves the purpose of a clipboard. For this purpose, a conventional spring clip 13 is provided adjacent left side edge 14 at about its mid-point. The spring clip 13 is adapted to hold sheets of paper, e.g., a shopping list.

The second main area 130 is in the form of a shallow, open, rectangular bin, defined by four low walls, namely inboard side wall 16, outboard side wall 17, front wall 18 and rear wall 19. The bin is adapted to hold bonus or discount coupons safely and orderly. For this purpose, a conventional spring clip 20 is provided adjacent rear wall 19 at about its mid-point. The spring clip is thus adapted to hold bonus or discount coupons. There is room also in the bin to hold a small pocket or hand-held calculator (not shown).

The third main area 14 is a narrow ledge adapted to hold a cylindrical writing instrument, e.g., a pencil or a ball-point pen. The cylindrical writing instrument may be held securely by a conventional spring clip 21 situated adjacent right side edge 22, at about one-third of its distance from the front edge 23. During use, the writing instrument may be held temporarily within hole 24.

An important and essential element of the shopper's helper assembly is the pair of spaced-apart spring holding clips 25 secured (by any conventional means) to the underface of board 11. These clips 25 are adapted to hold the shopper's helper assembly rigidly but temporarily to the transverse pushing handle of a conventional shopping cart, so that the shopping list, etc. is easily visible and usable by the shopper.

OPERATION AND ADVANTAGES OF PREFERRED EMBODIMENT

The assembly may be advantageously composed of a plastic material that will clean easily and not mark or stain other objects with which it comes into contact. Additionally, since the plastic material has a low noise level when dropped, it renders the clipboard particularly desirable. High impact polystyrene has been found suitable although any of a variety of other plastic materials having similar properties of strength, figidity and durability may be used.

The following are advantages and features of the novel assembly:

(a) This assembly affords space for shopping list, discount coupons, calculators and pencils;

(b) It can hold an abundance of paper; and (c) It can be carried into the store where shopping is to be done and can clip temporarily but securely onto the handle of a shopping cart.

SUMMARY

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

We claim:

1. A shopper's helper assembly comprising: (a) a base; (b) an open bin disposed adjacent one portion of said base, said open bin including a clip located therein for releasably retaining a plurality of sheets of paper, said bin being spaced a predetermined close distance from one side edge of said base to provide a first flat surface, and a predetermined large distance from the other side edge, thereby providing a second, flat, paper-supporting surface; (c) a clip located along a side edge of said first flat surface for releasably holding a cylindrical writing instrument thereon, and a hole at the top of said first flat surface for selectively releasably supporting said cylindrical writing instrument therein; (d) a clip located at an edge of said second, flat, paper-supporting surface for releasably retaining a pad of paper or a plurality of sheets of paper; and (e) at least one longitudinally extending, downwardly open, cross-section clamp secured to the undersurface of said base for releasably retaining said shopper's helper assembly on a complementarily-shaped support.

2. The shopper's helper assembly of claim 1 whereby said bin is integral with said base.

3. A shopper's helper assembly comprising (a) a rectangular base having a front edge, a rear edge, a right-hand edge and a left-hand edge; (b) a rectangular open bin disposed adjacent the right-hand edge of said rectangular base, said bin having a long inboard side wall, a long outboard side wall, a short front wall contiguous to said front edge of said base and a short rear wall, said open bin including a clip located at an wall thereof for releasably retaining a plurality of sheets of paper; said outboard side wall being spaced a predetermined close distance from said right-hand side edge of said base to provide a narrow ledge between said long outboard wall and said right-hand edge, said narrow ledge having a right-hand side edge contiguous to said rear edge of said base, a rear edge contiguous to said rear edge of said base and a front edge, contiguous to said front edge of said base, and said long inboard wall being spaced a predetermined large distance from said left-hand side edge, thereby providing a flat plateau paper-supporting clipboard surface between said long inboard wall and said left-hand edge, said flat plateau having a left-hand side edge contiguous to said left-hand side edge of said base, a rear edge contiguous to said rear edge of said base, and a front edge contiguous to said front edge of said base; (c) a clip located along said right-hand side edge of said narrow ledge for releasably holding a cylindrical writing instrument thereof, and a hole adjacent the upper edge of said narrow ledge for selectively releasably supporting said cylindrical writing instrument therein; (d) a clip located along an edge of said flat plateau paper-supporting clipboard for releasably retaining a pad of paper, or a plurality of sheets of paper; and (e) at least one longitudinally extending, downwardly open-cross-section clamp secured to the underface of said base for releasably retaining said shopper's helper assembly on a complementarily-shaped support.

4. The shopper's helper assembly of claim 3 wherein said clip located at a wall of said open bin is contiguous with said short rear wall of said rectangular open bin.

5. The shopper's helper assembly of claim 4 wherein said clip located at a wall of said open bin is located at the central portion of said short rear wall.

6. The shopper's helper assembly of claim 3 wherein said clip along said right-hand side edge of said narrow ledge is located one-third of the distance from said lower edge of said narrow ledge.

7. The shopper's helper assembly of claim 3 wherein said clip at an edge of said flat plateau is located contiguous to said left-hand side edge thereof.

8. The shopper's helper assembly of claim 6 wherein said clip at an edge of said flat plateau is centrally located contiguous to said left-hand side edge thereof.

9. The shopper's helper of claim 3 wherein said at least one longitudinally extending open-cross-section clamp comprises a pair of spaced-apart, clamps.

10. The shopper's helper of claim 9 wherein said pair of spaced-apart clamps each comprise a generally C-cross-section clamp, for releasable connection to a generally cylindrical support.

11. The shopper's helper of claim 9 wherein said clamps are offset, towards the rear edge of said rectangular base, from the central longitudinal axis of said rectangular base.

12. The shopper's helper of claim 11, wherein one said clamp is located adjacent the left-hand edge of said rectangular base, below said flat plateau and the other said clamp is located adjacent the right-hand edge of said rectangular base below said open rectangular bin.

13. The shopper's helper assembly of claim 10 wherein said two generally C-cross-section clamps are spaced apart along the central longitudinal axis of said rectangular base.

14. The shopper's helper assembly of claim 13 wherein one said generally C-cross-section clamp is centrally located with respect to said rectangular open bin, and wherein said other said generally C-cross-section clamp is centrally located with respect to said flat plateau.

* * * * *